United States Patent [19]

Hatsutta et al.

[11] Patent Number: 4,601,515
[45] Date of Patent: Jul. 22, 1986

[54] SEAT FOR VEHICLES

[75] Inventors: Susumu Hatsutta; Takashi Yasui, both of Akishimashi, Japan

[73] Assignee: Tachikawa Spring Co., Ltd., Tokyo, Japan

[21] Appl. No.: 640,787

[22] Filed: Aug. 14, 1984

[30] Foreign Application Priority Data

Aug. 19, 1983 [JP] Japan .............. 58-129111[U]

[51] Int. Cl.⁴ .............................................. B60N 1/02
[52] U.S. Cl. .................................. 297/361; 296/65 R; 297/117; 297/330
[58] Field of Search ............. 297/361, 330, 232, 117, 297/238, 306; 296/64, 65 R; 244/118.6

[56] References Cited

U.S. PATENT DOCUMENTS 3,424,492  6/1969  Tabor .................. 297/361
3,588,170  6/1971  Knabusch et al. ............. 297/330 X
3,888,540  6/1975  Protze .................. 297/117 X

FOREIGN PATENT DOCUMENTS 882945  11/1961  United Kingdom ............. 297/232

OTHER PUBLICATIONS

Trans-Australia Airlines Brochure, Mar. 1979.

*Primary Examiner*—James T. McCall
*Attorney, Agent, or Firm*—Hoffmann, Dilworth, Barrese & Baron

[57] ABSTRACT

A seat for vehicles is provided with a reclining device and a remote control means for remotely controlling the reclining device, in which seat an arm rest is pivotally mounted and provided at its forward end portion with the remote control means and at its upper portion with a recessed portion for receipt of one or more small articles. The arm rest has a linking mechanism arranged therewithin for mechanically linking the remote control means to the reclining device. The linking mechanism comprises a rod connected to the remote control means, a substantially V-shaped arm having a first leg portion and a second leg portion, of which leg portions the first leg portion is connected with the rod, an operation wire connected to the second leg portion of the substantially V-shaped arm and further connected to the reclining device and a spring extended between the first leg portion of the arm and the inner wall of the arm rest.

2 Claims, 4 Drawing Figures

SEAT FOR VEHICLES

FIELD OF THE INVENTION

The present invention relates to a seat for vehicles including a rear seat back, and the like, which are provided with a reclining device and an arm rest.

BACKGROUND OF THE INVENTION

A hitherto conventional seat for vehicles of this type is generally provided with a remote control device for remotely controlling the reclining device. Said remote control device is usually arranged on the lateral wall portion of the seat or somewhere externally of the same. This prior art arrangement, however, impairs the external aesthetic appearance of the seat. Further, there is a drawback in this type of construction in that the reclining device arranged on one lateral wall portion of the seat is not within reach of an occupant sitting on the opposite side of the reclining device, thus presenting a problem in the operational accessibility thereof.

SUMMARY OF THE INVENTION

It is an object of the present invention to provide a seat for vehicles permitting an easy control of seat reclining to be effected by each occupant sitting on both sides of a seat in his or her seated posture.

It is another object of the present invention to provide a seat for vehicles with an improved aesthetic appearance thereof.

In order to achieve the above-mentioned objects, the present invention aims at providing a seat for vehicles which comprises an arm rest pivotally mounted substantially at a center position in the width-wise direction of the seat, a reclining device for inclining the seat and a remote control means arranged on the arm rest for controlling the reclining device.

BRIEF DESCRIPTION OF THE DRAWINGS

In the drawings:

FIG. 1 is a perspective view of a seat for vehicles according to the present invention;

FIG. 2 is a side view thereof;

FIG. 3 is a perspective view of an arm rest; and,

FIG. 4 is a cross sectional view taken along the line (X)—(X) in the FIG. 3.

DESCRIPTION OF THE PREFERRED EMBODIMENTS

Hereinafter, one embodiment of the present invention will be described with reference to the accompanying drawings.

Figure 1:
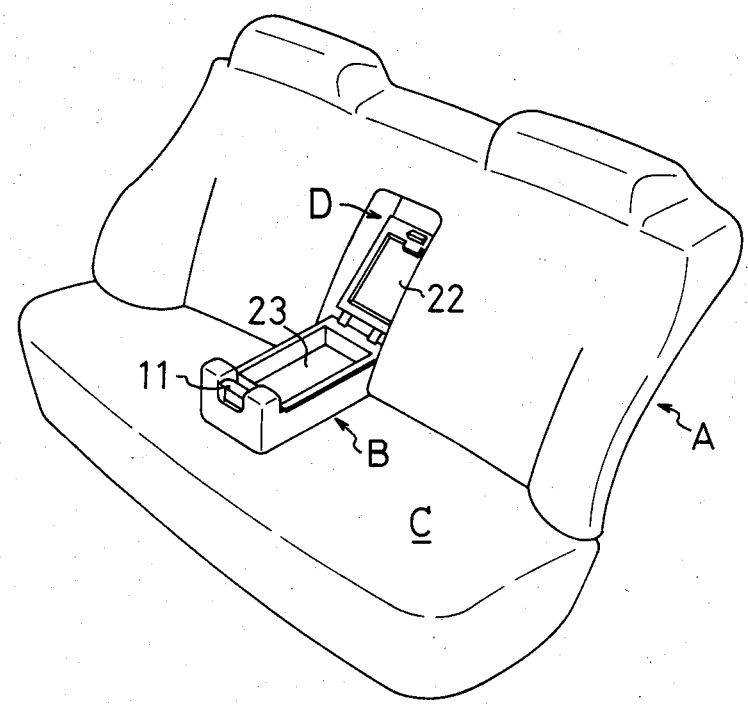
FIG. 1 to FIG. 4 show one embodiment according to the present invention.
Figure 2:
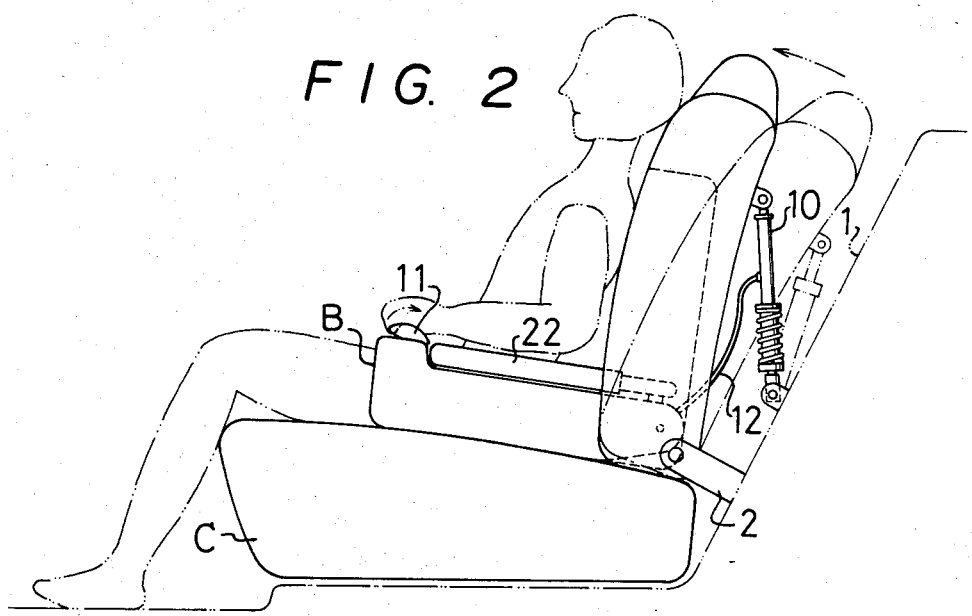
Figure 3:
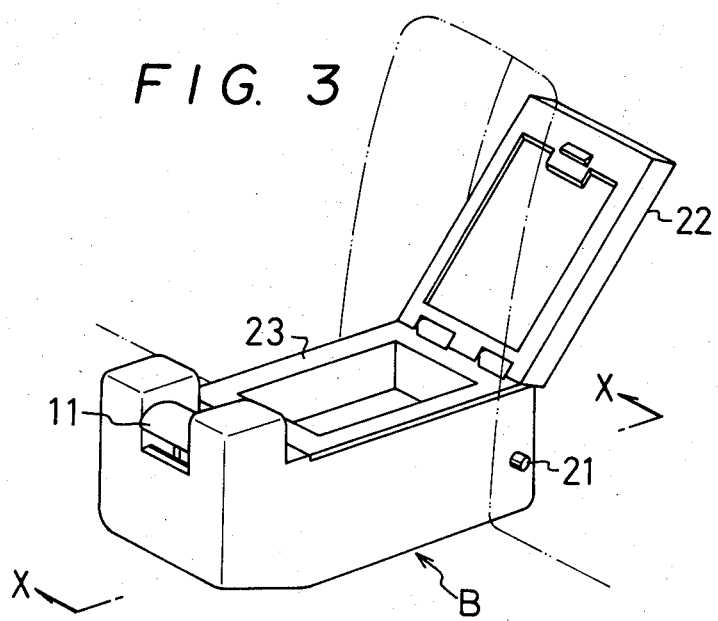

In the drawings, designation (A) shows a seat for vehicles (seat back) according to the present invention. An arm rest (B) is pivotally mounted substantially at a center position in the width-wise direction of the seat so that the arm rest is allowed to be rotated to its storage position within a recessed arm rest housing (D) formed in the seat, or seat back (A). At the forward end portion of arm rest (B), a remote control means (11) is provided for controlling reclining device (10). When control means (11) is operated in such matter as illustrated in FIG. 2, reclining device (10) is actuated so as to adjust an angle of seat back (A) from the position shown in broken line to the position shown in solid line.

Reclining device (10) is a conventional elevating device, the example of which includes a frictional locking device as disclosed in Japanese Utility Model Publication No. 55-50407, which is disposed between seat back (A) and a wall surface of vehicle body (1). Control of the reclining device is effected through an operating wire (12) in a remote manner by remote control means (11).

Seat back (A) is pivotally fixed by means of hinge (2) to the wall surface of vehicle body (1) or to a seat cushion (C) so as to be rotatable relative to seat cushion (C).

Figure 4:
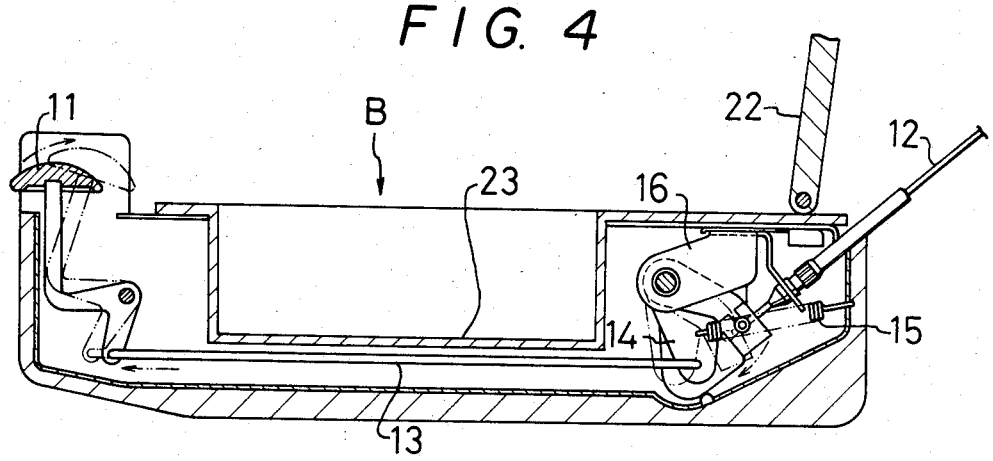

Arm rest (B) is pivotally fixed to seat back (A) by means of a pin (21) and the upper portion thereof is formed into a recess portion (23) for receiving some small articles. The recess portion has a lid (22) provided thereon. At the forward end portion of arm rest (B) adjacent to recess portion (23), there is provided remote control means (11) which is connected to one end of a rod (13) extending beneath the bottom of recess portion (23) within arm rest (B). The other end of rod (13) is operatively connected via a V-shaped arm (14) to the operating wire (12). The V-shaped arm (14) has two leg portions, a first leg portion and a second leg portion, respectively. The first leg portion of V-shaped arm (14) is connected with said other end of rod (13) and further with a spring (15) secured to the inner wall of arm rest (B). the second leg portion of arm (14) is connected with operating wire (12) extending from the rear wall of arm rest (B) and operatively connected to reclining device (10). Thus, spring (15) biases the first leg portion of arm (14) in a direction opposite to the operating direction of remote control means (11) so as to retain control means (11) in the position shown in the solid line, i.e., in its initial position (FIG. 4), while at the same time causing the second leg portion of arm (14) to rotate so as to move operating wire (12) in a direction opposite to the operating direction of remote control means (11). When the remote control means (11) is operated with a force overcoming the resilience of spring (15) in the direction of the arrow as shown in FIG. 4, operating wire (12) is pulled to actuate reclining device (10) thereby permitting a stepless adjustment of an angle of inclination of the seat back (A).

In the drawings, designation (16) denotes a bracket for pivotally supporting V-shaped arm (14).

While seat back (A) illustrated in the drawings is so constructed that the whole body thereof is subjected to the angle adjustment by means of reclining device (10), it may also be so constructed that the back seat itself is divided into two seat sections on the right and left in the width-wise direction of the seat with one reclining device provided on each of the two seat sections whereby each seat section can be independently adjusted in its angle of inclination by an individual occupant. In this case, the associated remote control means for controlling each reclining device should be collectively arranged at arm rest (B).

From the above description, it can be seen that a seat for vehicles according to the present invention has a remote control means arranged at the position nearest to both occupants sitting on the left and right sides in the seat and consequently makes it convenient for them to effect a reclining operation while putting their hands on the arm rest of the seat. Furthermore, the present invention solves the problems on the arrangement of an operating wire which operatively extends between a reclining device and a remote control means for remotely controlling the reclining device. That is, the exposure of the operating wire to the exterior of the seat is avoided since the present invention is of such construction that the operating wire can be arranged within the arm rest of the seat and extended through the arm rest container portion of the seat towards the reclining device provided behind the seat back. This, in turn, avoids any special modification of the seat back for passing the operating wire therethrough.

We claim:

1. In a seat for vehicles provided with an arm rest located substantially at a center position in the widthwise direction of the seat, a reclining device located at the rear side of the seat for inclining the seat and a remote control means arranged on said arm rest for remotely controlling said reclining device, the improvement wherein said arm rest is pivotally, rotatably mounted on said seat and has a recessed portion formed at the upper portion thereof with a lid being pivotally, rotatably fixed thereto for covering said recessed portion, wherein an arm rest housing for containing said arm rest therein is formed in said seat at the position corresponding to said arm rest, wherein said remote control means are arranged at the forward end portion of said arm rest adjacent to said recessed portion, and wherein a linking mechanism for linking said remote control means to said reclining device is provided within said rest arm and comprises:

a rod member extending beneath the bottom of said recessed portion, said rod member being connected at one end thereof to said remote control means;

a substantially V-shaped arm member pivotally, rotatably fixed at the rearward portion of said arm rest, said arm having a first leg portion to which the other end of said rod member is connected and a second leg portion;

a spring means extended between said first leg portion of said arm member and the inner wall of said rest arm, said spring means being adapted to resiliently bias said first leg portion in a direction opposite to the operating direction of said remote control means; and, an operation wire provided at the rear portion of said arm rest, said operation wire being of such an arrangement that one end thereof is connected to said second leg portion of said substantially V-shaped arm member while the other end thereof extends through the wall of said arm rest to connect with said reclining device.

2. The seat for vehicles according to claim 1, wherein said substantially V-shaped arm member is pivotally supported by a bracket which is fixed to the inner wall of said arm rest.

* * * * *